US008788797B2

(12) United States Patent
Krishnamurthy et al.

(10) Patent No.: US 8,788,797 B2
(45) Date of Patent: Jul. 22, 2014

(54) COMBINED LEVEL 1 AND LEVEL 2 BRANCH PREDICTOR

(75) Inventors: Trivikram Krishnamurthy, Sunnyvale, CA (US); Anthony Jarvis, Acton, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 826 days.

(21) Appl. No.: 12/975,686

(22) Filed: Dec. 22, 2010

(65) Prior Publication Data

US 2012/0166775 A1     Jun. 28, 2012

(51) Int. Cl.
    *G06F 9/38*         (2006.01)

(52) U.S. Cl.
    CPC .................. *G06F 9/3848* (2013.01)
    USPC ........................................ 712/239

(58) Field of Classification Search
    CPC ..................................... G06F 9/3848
    USPC ........................................ 712/239
    See application file for complete search history.

(56) References Cited

U.S. PATENT DOCUMENTS

| | | | | |
|---|---|---|---|---|
| 5,353,421 A * | 10/1994 | Emma et al. | .................. | 712/240 |
| 7,165,169 B2 * | 1/2007 | Henry et al. | .................. | 712/240 |
| 7,533,252 B2 * | 5/2009 | Davis et al. | .................. | 712/239 |
| 8,151,096 B2 * | 4/2012 | Hum et al. | ..................... | 712/239 |

OTHER PUBLICATIONS

McFarling, Scott, "Combining Branch Predictors" WRL Technical Note TN-36, Jun. 1993.
Jimenez et al., "Neural Methods for Dynamic Branch Prediction" ACM Transactions on Computer Systems, vol. 20, No. 4, Nov. 2002, pp. 369-397.
Jimenez et al., "Dynamic Branch Prediction with Perceptrons" Proceedings of the Seventh International Symposium on High Performance Computer Architecture, 2000.

\* cited by examiner

*Primary Examiner* — Robert Fennema
*Assistant Examiner* — Benjamin Geib
(74) *Attorney, Agent, or Firm* — Volpe and Koenig, P.C.

(57) ABSTRACT

A branch predictor for use in a processor includes a Level 1 branch predictor, a Level 2 branch predictor, a match determining circuit, and an override determining circuit. The Level 1 branch predictor generates a Level 1 branch prediction. The Level 2 branch predictor generates a Level 2 branch prediction. The match determining circuit determines whether the Level 1 and Level 2 branch predictions match. The override determining circuit determines whether to override the Level 1 branch prediction with the Level 2 branch prediction. The Level 1 branch prediction is used when the Level 1 and Level 2 branch predictions match or when the Level 1 and Level 2 branch predictions do not match and the Level 1 branch prediction is not overridden. The Level 2 branch prediction is used when the Level 1 and Level 2 branch predictions do not match and the Level 1 branch prediction is overridden.

19 Claims, 6 Drawing Sheets

COMBINED LEVEL 1 AND LEVEL 2 BRANCH PREDICTOR

FIELD OF INVENTION

The present invention relates to processors, and more particularly, to a combined Level 1 and Level 2 branch predictor for use in a processor.

BACKGROUND

Processors, including central processing units (CPUs) and graphical processing units (GPUs), are utilized in various applications. A standard configuration is to couple a processor with a storage unit, such as a cache, a system memory, or the like. Processors may execute a fetch operation to fetch instructions from the storage unit as needed. A processor pipeline includes several stages for processing instructions. In one implementation, a four stage pipeline may be used, and includes a fetch stage, a decode stage, an execution stage, and a write-back stage. Instructions progress through the pipeline stages in order.

To speed up the operation of the processor, it is desirable to have a full pipeline. One way of filling the pipeline is to fetch subsequent instructions while previous instructions are being processed. To be able to fetch ahead several instructions, a branch predictor may be used. A branch predictor predicts the direction of a branch instruction (i.e., taken or not-taken) and the branch target address before the branch instruction reaches the execution stage in the pipeline.

This is known as "pre-fetching" an instruction and "speculatively executing" the instruction. An instruction is speculatively executed because it is not known whether the prediction is correct until the branch instruction reaches the execution stage. Although pre-fetching and speculatively executing the instructions without knowing the actual direction of the branch instruction may result in speeding up the instruction processing, it may have the opposite effect and may result in stalling the pipeline if branch directions are mispredicted. If a branch misprediction occurs, the pipeline needs to be flushed and the instructions from the correct branch direction are executed. This may severely impact the performance of the system.

Several different types of branch predictors have been used. A bimodal predictor makes a prediction based on recent history of a particular branch's execution, and provides a prediction of taken or not-taken. A global predictor makes a prediction based upon recent history of all the branches' execution, not just the particular branch of interest. A two-level adaptive predictor with a globally shared history buffer, a pattern history table, and an additional local saturating counter may also be used, such that the outputs of the local predictor and the global predictor are XORed with each other to provide a final prediction. More than one prediction mechanism may be used simultaneously, and a final prediction is made based either on a meta-predictor that remembers which of the predictors has made the best predictions in the past, or a majority vote function based on an odd number of different predictors.

FIG. 1 is a block diagram of an existing Level 1 branch predictor 100. The branch predictor 100 includes a first predictor (P1) 102, a second predictor (P2) 104, a multiplexer (mux) 106, and a chooser 108. The program counter 110 (which is the address of the branch being predicted) and other inputs 112 are evaluated by both the first predictor 102 and the second predictor 104, and each makes its own prediction.

The program counter 110 is also supplied as an input to the chooser 108, which uses the program counter 110 to determine which predictor (either the first predictor 102 or the second predictor 104) is more accurate. The chooser 108 makes a prediction choice 114, which is supplied as the selector to the multiplexer 106. The selected predictor is used as the prediction 116 of the branch predictor 100.

FIG. 2 is a block diagram of another existing Level 1 branch predictor 200. In one implementation, the Level 1 predictor 200 may be a McFarling hybrid predictor. The branch predictor 200 is similar in construction to the branch predictor 100, but with a different implementation for some of the components. The branch predictor 200 includes a first predictor 202 (implemented as an array of bimodal counters), a second predictor 204 (implemented as an array of bimodal counters), a multiplexer (mux) 206, and a bimodal chooser 208. Each predictor 202, 204 makes its own prediction. The second predictor 204 includes an XOR unit 210 and an array of bimodal counters 212.

The program counter 220 (e.g., the branch address) is supplied as an input to the first predictor 202, the second predictor 204, and the chooser 208. The first predictor 202 bases its prediction on a saturating bimodal two bit counter, indexed by the low order address bits of the program counter 220.

The global history 222 keeps a history of the direction taken by the most recent N branches (indexed by the branch address), and is supplied as an input to the second predictor 204. The XOR unit 210 performs an exclusive OR operation on the program counter 220 and the global history 222, which produces a hash used as an index into the array 212.

The chooser 208 uses the program counter 220 to look up in a table which predictor (either the first predictor 202 or the second predictor 204) is more accurate. The chooser 208 makes a prediction choice 224, which is supplied as the selector to the multiplexer 206. The selected predictor is used as the Level 1 prediction 226 of the branch predictor 200.

FIG. 3 is a block diagram of an existing Level 2 branch predictor known as a hashed perceptron 300. The hashed perceptron 300 includes a bias weight array 302, a plurality of weight arrays $304_1, 304_2, \ldots, 304_n$, and an adder 306. The program counter 310 is supplied as an input to the bias weight array 302 and the weight arrays $304_1$-$304_n$.

The bias weight array 302 is an array of weights, where each weight is a number of bits (e.g., four or eight). The bias weight array 302 is indexed into using the program counter 310 or a hash of the program counter 310 to obtain a weight value that is supplied to the adder 306.

Each weight array $304_1$-$304_n$ is indexed by a hash of the program counter 310 and different bits of the global history 312 to obtain a weight value. Each weight array $304_1$-$304_n$ includes an XOR unit 314 to produce the hash by performing an exclusive OR operation on the program counter 310 and the portion of the global history 312. The global history is a list of past outcomes of all branches, not including the current branch, whether the branch was taken or not taken. The least significant bits of the global history contain information about the most recent branches encountered, while the most significant bits of the global history contain information about older branches encountered.

The adder 306 adds the weights obtained from the bias weight array 302 and each of the weight arrays $304_1$-$304_n$ to obtain a sum value, and the most significant bit (MSB) of the sum value is the prediction 316. For example, if the MSB of the sum value is "1," then the prediction is "not taken" and if the MSB of the sum value is "0," then the prediction is "taken."

It is noted that in one implementation of the hashed perceptron 300, all of the weight values are sign-extended prior to the addition, to prevent an overflow of the adder 306, which could result in an incorrect prediction. Using a hash function to generate an index into the bias weight array 302 and each of the weight arrays $304_1$-$304_n$ generates a small index (in terms of the number of bits that make up the index), because both the program counter 310 and the global history 312 can each contain a large number of bits.

Branch predictors are typically large and complex structures. As a result, they consume a large amount of power and incur a latency penalty for predicting branches. It is desirable to have better branch prediction, because better branch prediction has an impact on the performance and the power efficiency of the processor. One challenge is how to improve branch prediction accuracy while not significantly changing the existing fast Level 1 predictor.

SUMMARY OF EMBODIMENTS

A method for generating a prediction in a processor includes generating a first prediction, generating a second prediction, and selecting one of the predictions to use. The first prediction is used if the first prediction and the second prediction match or if the first prediction and the second prediction do not match and the first prediction is not overridden by the second prediction. The second prediction is used if the first prediction and the second prediction do not match and the first prediction is overridden by the second prediction.

A branch predictor for use in a processor includes a Level 1 branch predictor, a Level 2 branch predictor, a match determining circuit, and an override determining circuit. The Level 1 branch predictor is configured to generate a Level 1 branch prediction. The Level 2 branch predictor is configured to generate a Level 2 branch prediction. The match determining circuit is configured to determine whether the Level 1 branch prediction matches the Level 2 branch prediction. The override determining circuit is configured to determine whether to override the Level 1 branch prediction with the Level 2 branch prediction.

A computer-readable storage medium storing a set of instructions for execution by one or more processors to facilitate manufacture of a branch predictor is disclosed. The branch predictor includes a Level 1 branch predictor, a Level 2 branch predictor, a match determining circuit, and an override determining circuit. The Level 1 branch predictor is configured to generate a Level 1 branch prediction. The Level 2 branch predictor is configured to generate a Level 2 branch prediction. The match determining circuit is configured to determine whether the Level 1 branch prediction matches the Level 2 branch prediction. The override determining circuit is configured to determine whether to override the Level 1 branch prediction with the Level 2 branch prediction.

BRIEF DESCRIPTION OF THE DRAWINGS

A more detailed understanding of the invention may be had from the following description, given by way of example, and to be understood in conjunction with the accompanying drawings, wherein.

DETAILED DESCRIPTION

A branch predictor for use in a processor includes a Level 1 branch predictor, a Level 2 branch predictor, a match determining circuit, and an override determining circuit. The Level 1 branch predictor is configured to generate a Level 1 branch prediction. The Level 2 branch predictor is configured to generate a Level 2 branch prediction. The match determining circuit is configured to determine whether the Level 1 branch prediction matches the Level 2 branch prediction. The override determining circuit is configured to determine whether to override the Level 1 branch prediction with the Level 2 branch prediction. The Level 1 branch prediction is used when the Level 1 branch prediction and the Level 2 branch prediction match or when the Level 1 branch prediction and the Level 2 branch prediction do not match and the Level 1 branch prediction is not overridden. The Level 2 branch prediction is used when the Level 1 branch prediction and the Level 2 branch prediction do not match and the Level 1 branch prediction is overridden.

Figure 1:
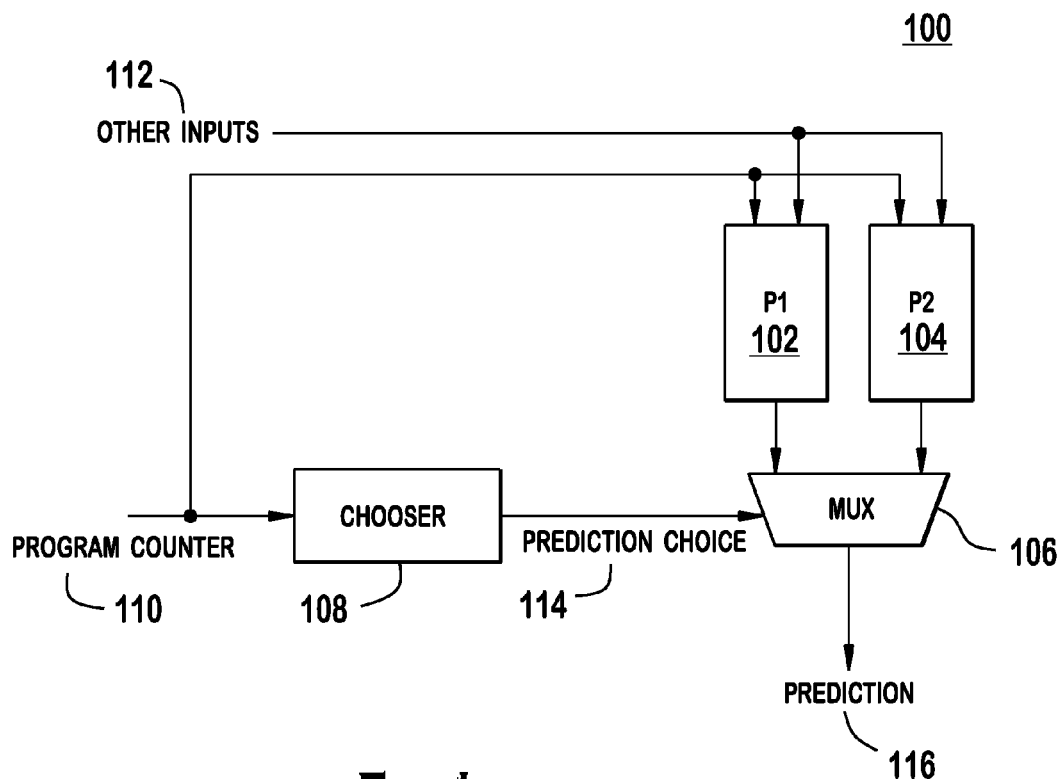
FIG. 1 is a block diagram of an existing Level 1 branch predictor.
Figure 2:
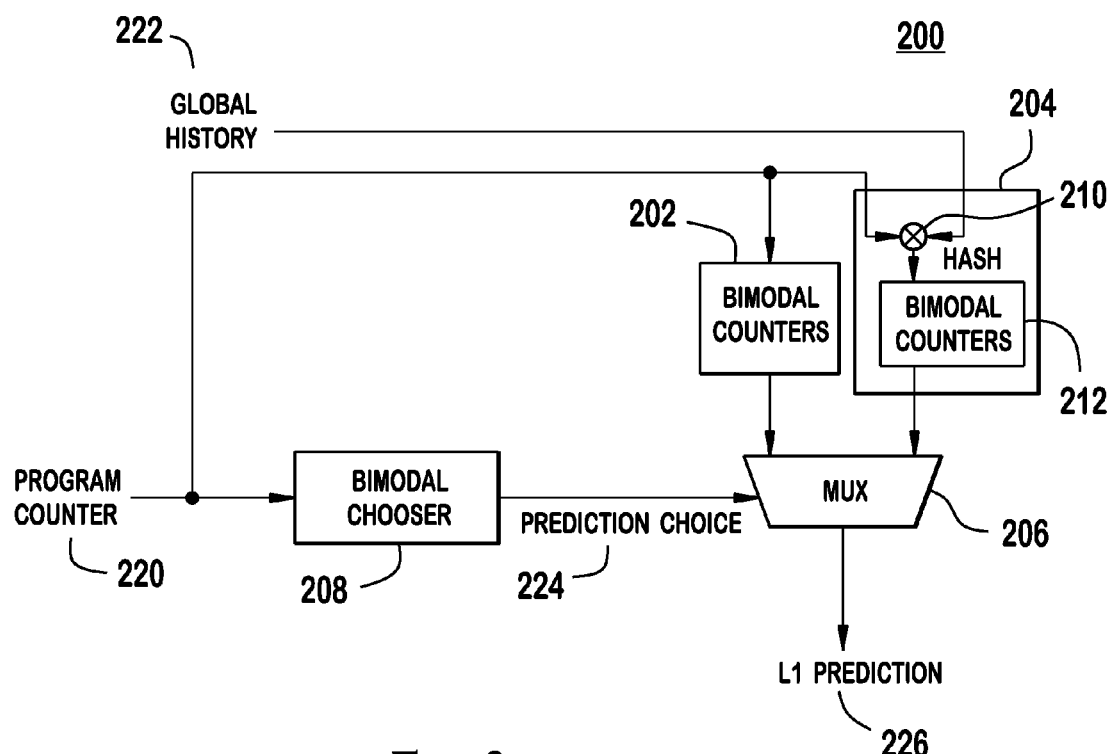
FIG. 2 is a block diagram of another existing Level 1 branch predictor.
Figure 3:
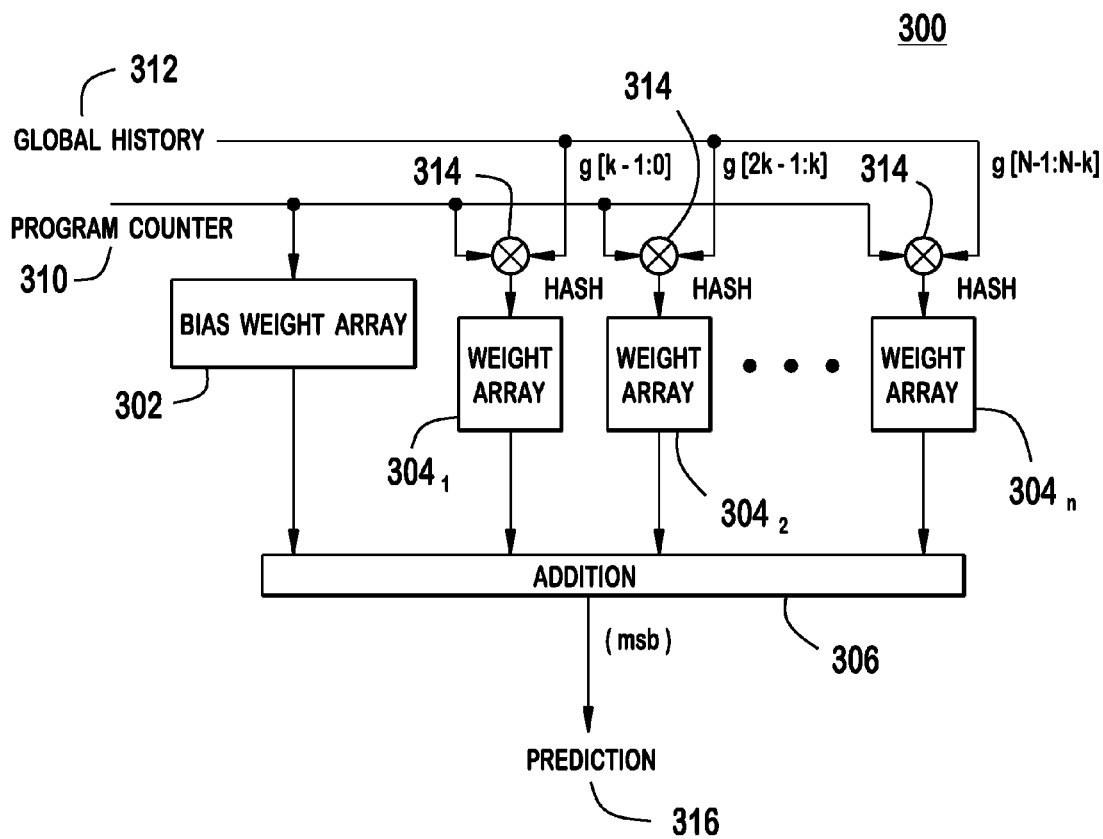
FIG. 3 is a block diagram of an existing Level 2 branch predictor (a hashed perceptron)
Figure 4:
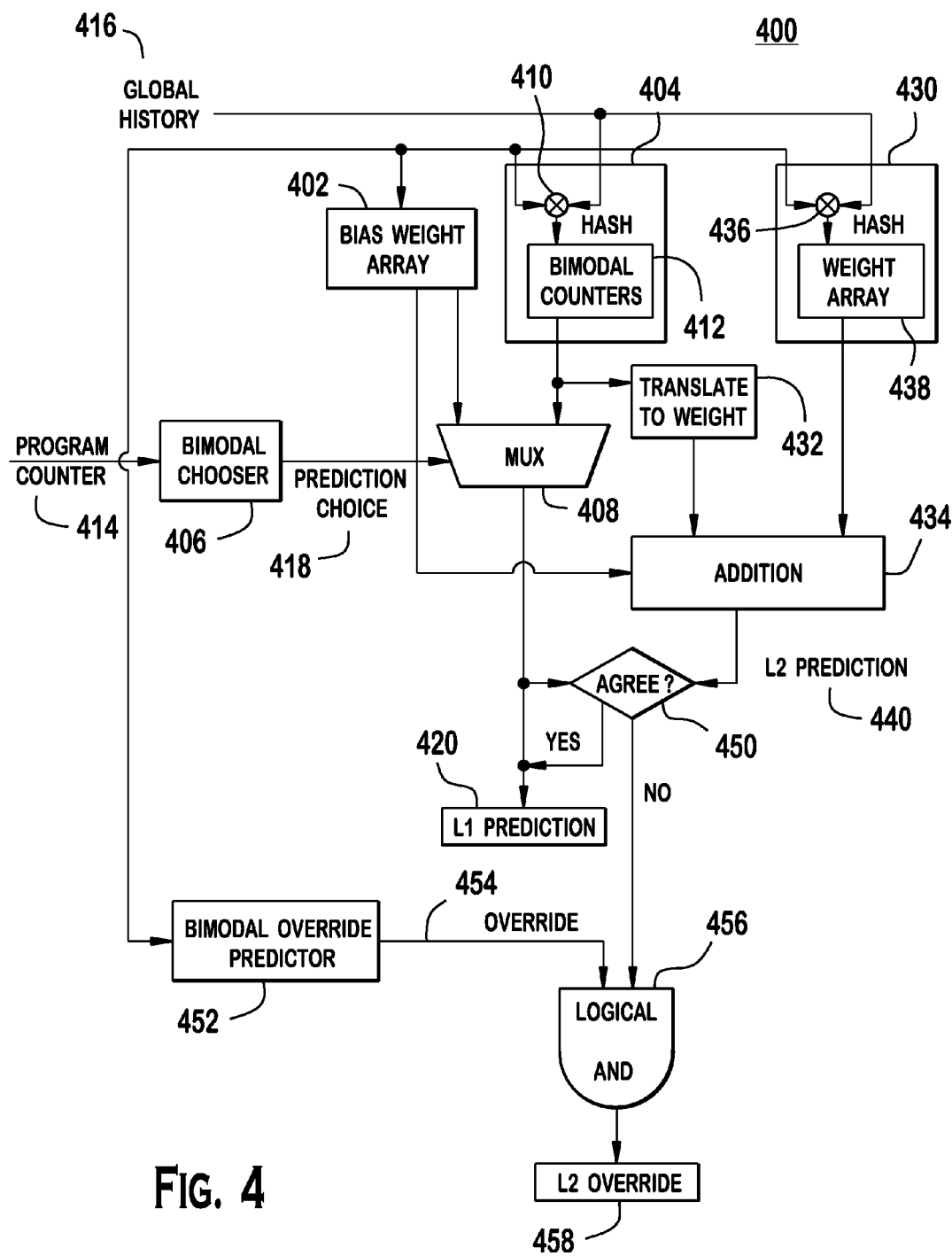
FIG. 4 is a block diagram of a specific implementation of a combined Level 1 and Level 2 branch predictor.

FIG. 4 is a block diagram of a combined Level 1 and Level 2 branch predictor 400. The predictor 400 has a Level 1 portion, which includes a bias weight array 402, a first predictor 404, a bimodal chooser 406, and a multiplexer (mux) 408. The first predictor 404 includes an XOR unit 410 and an array of two bit bimodal counters 412. The program counter 414 and the global history 416 are provided as inputs.

The bias weight array 402 is accessed with a hash of the program counter 414, to produce a weight value. The program counter 414 and the least significant bits of the global history 416 are input to the XOR unit 410 to produce a hash used as an index into the bimodal counters 412. In one implementation, the hash function used for indexing into the bias weight array 402 and the bimodal counters 412 is the same. In such an implementation, the hash function may be performed by the same hardware. In another implementation, a different hash function may be used for indexing into the bias weight array 402 and the bimodal counters 412.

Both the bias weight array 402 and the first predictor 404 each generate a Level 1 prediction and feed that prediction into the multiplexer 408. The bimodal chooser 406 is indexed with a hash of the program counter 414 and generates a prediction choice 418. The prediction choice 418 is used as the selector for the multiplexer 408 to select the Level 1 prediction 420.

The predictor 400 also has a Level 2 portion, which includes the bias weight array 402, the first predictor 404, a second predictor 430, a weight translator 432, and an adder 434. The second predictor 430 includes an XOR unit 436 and a weight array 438. The program counter 414 and the most significant bits of the global history 416 are input to the XOR unit 436 to produce a hash as an index into the weight array 438. The selected weight from the weight array 438 is input to the adder 434.

When being used for the Level 1 predictor, the bimodal counters 412 do not need to have many bits (e.g., two bits are sufficient for the Level 1 predictor). But to use the output of the bimodal counters 412 as an input to the adder 434, it needs to be translated into a weight by the weight translator 432. In one implementation, there may be a fixed mapping to extend the two bit bimodal counter value to a four bit weight value. The third input into the adder 434 is the output of the bias weight array 402, which is a native four bit value that does not need to be translated prior to being input into the adder 434. The sum of the appropriately sign-extended values received from the bias weight array 402, the weight translator 432, and the second predictor 430 is the Level 2 prediction 440.

The Level 1 prediction is generated in one cycle and the Level 2 prediction is generated in four cycles. The Level 1 and Level 2 predictions are compared to determine if they are the same (comparison block 450). If the Level 1 and Level 2 predictions are the same, then the Level 1 prediction 420 is used as the output of the predictor 400. If the Level 1 prediction and the Level 2 prediction do not agree, then a determination needs to be made whether to override the Level 1 prediction and use the Level 2 prediction as the output of the predictor 400.

The bimodal override predictor 452 is used to select which prediction (Level 1 or Level 2) to choose when the two predictions disagree. The program counter 414 is used as an index into the override predictor 452 (an array of two bit counters), which outputs an override signal 454. The override signal 454 is one bit of the selected two bit value, which is input into the AND gate 456 to be logically ANDed with the Level 2 prediction 440 to determine the Level 2 override prediction 458.

The Level 2 prediction should only be chosen when necessary (i.e., when it is more likely to be accurate), because it takes longer to generate the Level 2 prediction (four cycles) than to generate the Level 1 prediction (one cycle). Another reason is that there is a four cycle penalty for mis-speculation when redirecting to the Level 2 predictor, because when the Level 2 predictor is used, four cycles of prediction are "wasted" while "correcting" the Level 1 prediction.

Most branches are correlated to more recent branches than to older branches. To ensure that the Level 1 prediction is as accurate as possible (because it is generated faster) and to capture those correlations, the Level 1 predictor 404 uses the least significant bits of the global history 416. If the Level 2 prediction 440 agrees with the Level 1 prediction 420, there is no need to override the Level 1 prediction, so the Level 1 prediction should be used.

If the Level 2 prediction 440 disagrees with the Level 1 prediction 420, the Level 1 prediction may be overridden, but the override is not required, because there are cases where using the Level 1 prediction would be appropriate. For example, there are cases that the Level 1 predictor correctly predicts the branch and the Level 2 predictor does not correctly predict the branch (i.e., there are certain kinds of branches that the Level 2 predictor does not work well with).

The override predictor 452 can be trained as follows. The first time it is used, the override predictor 452 blindly chooses one predictor when the Level 1 and Level 2 predictions disagree. When the branch actually executes, it will be known which predictor was correct. The override predictor 452 is trained to be biased toward the Level 1 prediction or the Level 2 prediction per program counter value because the training can be different for each branch.

Combining the Level 1 predictor and the Level 2 predictor as described herein makes the combination feasible within a given frequency target. It is difficult to combine these two predictors without significantly reducing the target frequency, thereby nullifying the performance that would have otherwise been gained. To maintain the frequency target means that only a fixed amount of work can be done per cycle. The benefit of the added prediction accuracy is to use the Level 2 prediction only when it is really needed.

Any type of Level 1 predictor that provides a good prediction accuracy with a low latency may be used, but only certain kinds of Level 1 predictors lend themselves to sharing resources with the Level 2 predictor as described herein. The Level 2 predictor as described herein is a hashed perceptron, but any higher accuracy, longer latency predictor will also work. Knowledge from prior predictions is used to indicate when to override the Level 1 prediction. To start, it is assumed that the Level 2 predictor is not needed and that only the Level 1 predictor is used. The Level 2 prediction is still recorded, and it can be determined after a branch has been executed to see which predictor (Level 1 or Level 2) predicted the branch correctly. If, over time, it appears that the Level 1 predictor is incorrectly predicting, while the Level 2 predictor is predicting correctly, then the combined predictor learns to override the Level 1 prediction with the Level 2 prediction.

The better accuracy obtained from the Level 2 prediction is used even though it comes at the cost of longer latency. The Level 2 prediction is valuable because there is the learned behavior that indicates when to override the Level 1 prediction and when to use the Level 1 prediction.

At least part of the Level 1 and Level 2 predictors share some hardware. Reusing the hardware in this way (e.g., sharing the global history tables) results in area and power savings. With the Level 2 predictor, better accuracy may be achieved with more tables, but at a higher power cost and area cost. These techniques require recording the outcomes of past branches. The more outcomes to be recorded, the more tables that are needed to make a prediction. In one implementation, a three table or four table Level 2 predictor may be used. While using more tables may benefit the Level 2 predictor, sharing resources between the Level 1 and Level 2 predictors requires that the number of tables used works well with the Level 1 predictor. Better accuracy may also be achieved by using four bit counters in the shared global history table instead of the bimodal counters 412, but with the tradeoff of requiring more area and consuming more power than using the bimodal counters.

The Level 2 predictor shares the two tables from the Level 1 predictor with the Level 2 predictor. The value read from the Level 1 predictor's address-hash-only table is used initially for the Level 1 prediction and then again for the Level 2 prediction. Likewise, the value read from the Level 1 global-history indexed table is used again as the Level 2 predictor's least significant bits global history table.

Figure 5:
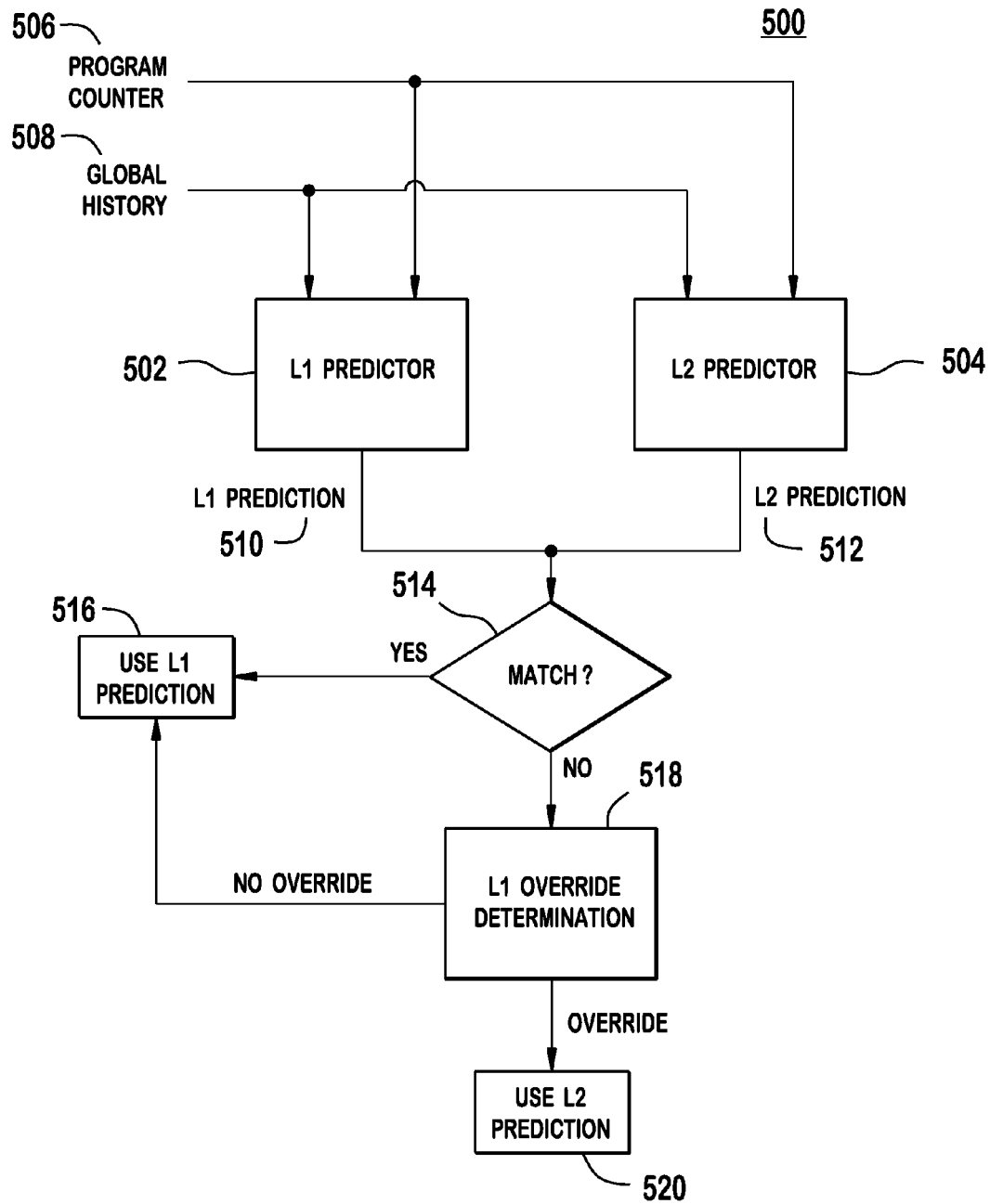
FIG. 5 is a block diagram of a combined Level 1 and Level 2 branch predictor.

FIG. 5 is a block diagram of a combined Level 1 and Level 2 branch predictor 500. The combined predictor 500 includes a Level 1 predictor 502 and a Level 2 predictor 504. A program counter 506 and a global history 508 are provided as inputs to the predictors 502, 504. The Level 1 predictor 502 generates a Level 1 prediction 510 based on the program counter 506 and a portion of the global history 508. The Level 2 predictor 504 generates a Level 2 prediction 512 based on the program counter 506 and a portion of the global history 508.

A matching circuit 514 determines whether the Level 1 prediction 510 and the Level 2 prediction 512 match. If both predictions 510, 512 match, then the Level 1 prediction 510 is used as the output 516 of the combined predictor 500. If the predictions 510, 512 do not match, then a Level 1 override determining circuit 518 determines whether to override the Level 1 prediction 510 with the Level 2 prediction 518. If the determining circuit 518 does not decide to override the Level 1 prediction, then the Level 1 prediction 510 is used as the output 516 of the combined predictor 500. If the determining circuit 518 decides to override the Level 1 prediction, then the Level 2 prediction 512 is used as the output 520 of the combined predictor 500.

Figure 6:
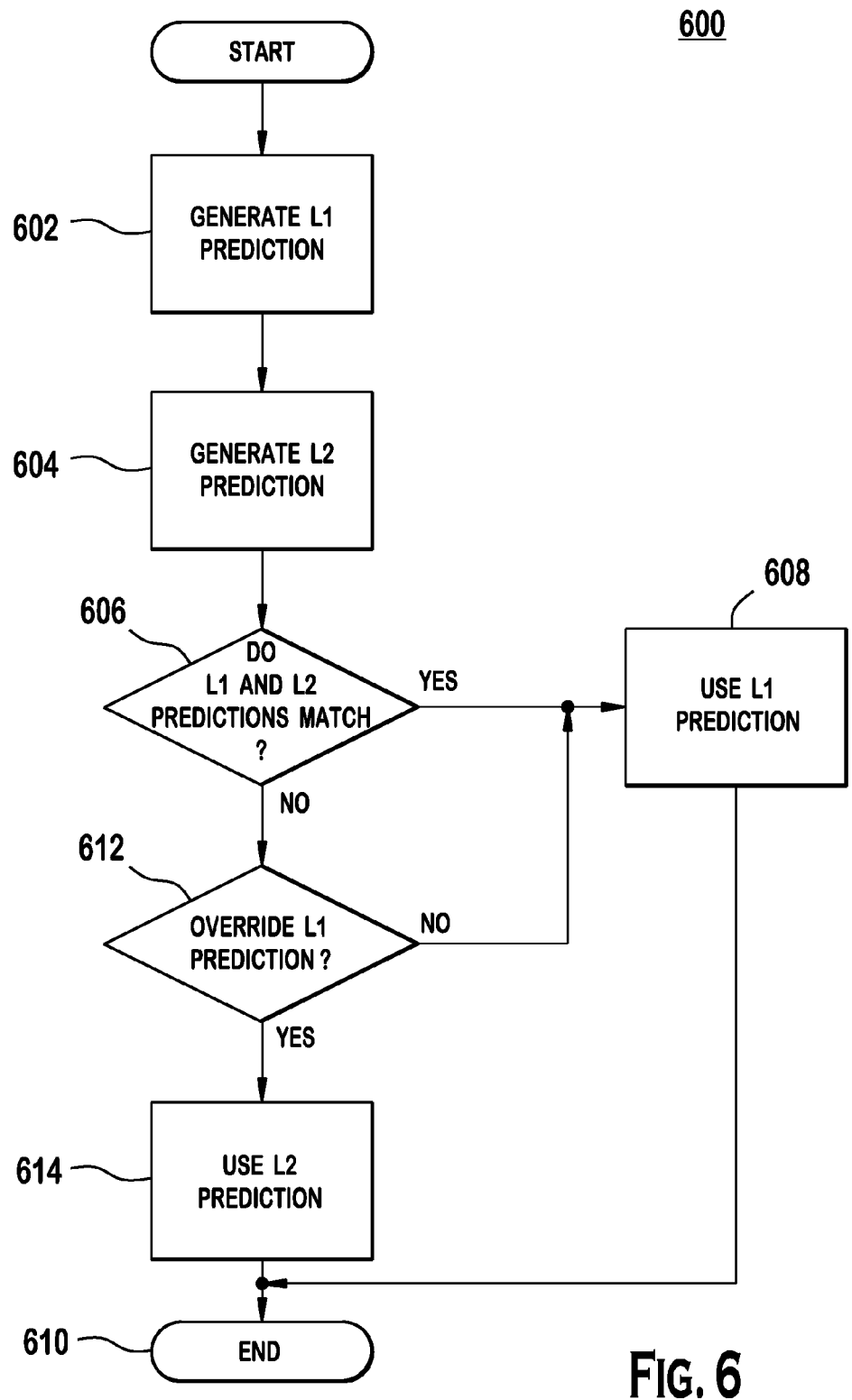
FIG. 6 is a flowchart of the operation of a combined Level 1 and Level 2 branch predictor.

FIG. 6 is a flowchart of a method 600 of operation of the combined Level 1 and Level 2 branch predictor. The method 600 begins by generating a Level 1 prediction (step 602) and generating a Level 2 prediction (step 604).

A determination is made whether the Level 1 prediction and the Level 2 prediction match (step 606). If the Level 1 and Level 2 predictions match, then the Level 1 prediction is used as the output of the combined predictor (step 608) and the method terminates (step 610). If the Level 1 and Level 2 predictions do not match (step 606), then a determination is made whether to override the Level 1 prediction (step 612). If the Level 1 prediction is not to be overridden, then the Level 1 prediction is used as the output of the combined predictor (step 608) and the method terminates (step 610). If the Level 1 prediction is to be overridden, then the Level 2 prediction is used as the output of the combined predictor (step 614) and the method terminates (step 610).

While the foregoing description relates to processor embodiments, the concepts described herein may also be applied to other situations where two predictions are made and one prediction is selected. Such situations include, but are not limited to: central processing unit and graphics processing unit predictions, including texture fetching; address generation; and input/output. The data relied on in making the predictions may also include any relevant prediction metadata, and are not limited to the program counter and the global history.

The present invention may be implemented in a computer program tangibly embodied in a computer-readable storage medium containing a set of instructions for execution by a processor or a general purpose computer. Method steps may be performed by a processor executing a program of instructions by operating on input data and generating output data.

Although features and elements are described above in particular combinations, each feature or element may be used alone without the other features and elements or in various combinations with or without other features and elements. The apparatus described herein may be manufactured by using a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data (e.g., netlists, GDS data, or the like) that may be used to perform a manufacturing process implemented in a semiconductor fabrication facility. The manufacturing process may be adapted to manufacture semiconductor devices (e.g., processors) that embody various aspects of the present invention.

Suitable processors include, by way of example, a general purpose processor, a special purpose processor, a conventional processor, a digital signal processor (DSP), a plurality of microprocessors, a graphics processing unit (GPU), a DSP core, a controller, a microcontroller, application specific integrated circuits (ASICs), field programmable gate arrays (FPGAs), any other type of integrated circuit (IC), and/or a state machine, or combinations thereof.

Typically, a processor receives instructions and data from a read-only memory (ROM), a random access memory (RAM), and/or a storage device. Storage devices suitable for embodying computer program instructions and data include all forms of non-volatile memory, including by way of example, semiconductor memory devices, magnetic media such as internal hard disks and removable disks, magneto-optical media, and optical media such as CD-ROM disks and DVDs. In addition, while the illustrative embodiments may be implemented in computer software, the functions within the illustrative embodiments may alternatively be embodied in part or in whole using hardware components such as ASICs, FPGAs, or other hardware, or in some combination of hardware components and software components.

While specific embodiments of the present invention have been shown and described, many modifications and variations could be made by one skilled in the art without departing from the scope of the invention. The above description serves to illustrate and not limit the particular invention in any way.

What is claimed is:

1. A branch predictor for use in a processor, comprising:
   a Level 1 branch predictor configured to generate a Level 1 branch prediction, wherein the Level 1 branch predictor includes:
   a bias weight array;
   a first predictor, including a first hash generator and a bimodal counter array;
   a bimodal chooser; and
   a multiplexer connected to the bias weight array, the first predictor, and the bimodal chooser;
   a Level 2 branch predictor configured to generate a Level 2 branch prediction;
   a match determining circuit configured to determine whether the Level 1 branch prediction matches the Level 2 branch prediction; and
   an override determining circuit configured to determine whether to override the Level 1 branch prediction with the Level 2 branch prediction.

2. The branch predictor according to claim 1, wherein a portion of the Level 1 branch predictor is shared with the Level 2 branch predictor.

3. The branch predictor according to claim 1, wherein the Level 1 branch predictor is configured to:
   receive a program counter value and a global history value; and
   generate the Level 1 branch prediction based on the program counter value and the global history value.

4. The branch predictor according to claim 3, wherein the global history value is the least significant bits of the global history of the branch predictor.

5. The branch predictor according to claim 1, wherein the Level 2 branch predictor is configured to:
   receive a program counter value and a global history value; and
   generate the Level 2 branch prediction based on the program counter value and the global history value.

6. The branch predictor according to claim 5, wherein the global history value is the most significant bits of the global history of the branch predictor.

7. The branch predictor according to claim 1, wherein the branch predictor uses the Level 1 branch prediction if the Level 1 branch prediction and the Level 2 branch prediction match.

8. The branch predictor according to claim 1, wherein the branch predictor uses the Level 1 branch prediction if the Level 1 branch prediction and the Level 2 branch prediction do not match and the Level 1 branch prediction is not overridden.

9. The branch predictor according to claim 1, wherein the branch predictor uses the Level 2 branch prediction if the Level 1 branch prediction and the Level 2 branch prediction do not match and the Level 1 branch prediction is overridden.

10. The branch predictor according to claim 1, wherein the bias weight array is an array of weights indexed by a hash of a program counter value and is configured to generate a weight value.

11. The branch predictor according to claim 10, wherein the first predictor is configured to:
generate a hash of the program counter value and least significant bits of a global history value; and
index into the bimodal counter array using the hash to select a predictor value.

12. The branch predictor according to claim 11, wherein the bimodal counter is configured to:
receive the program counter value as an input;
generate a selection value based on the program counter value; and
provide the selection value to the multiplexer to select between the weight value of the bias weight array and the predictor value of the first predictor to use as the Level 1 branch prediction.

13. The branch predictor according to claim 11, wherein the Level 2 branch predictor includes:
the bias weight array;
the first predictor;
a second predictor, including a second hash generator and a weight array;
a weight translator; and
an adder.

14. The branch predictor according to claim 13, wherein the second predictor is configured to:
generate a hash of the program counter value and most significant bits of the global history value; and
index into the weight array using the hash to select a second weight.

15. The branch predictor according to claim 14, wherein the weight translator is configured to translate the predictor value into a translated weight value.

16. The branch predictor according to claim 15, wherein the adder is configured to add the weight value of the bias weight array, the translated weight value of the first predictor, and the second weight of the second predictor to generate the Level 2 branch prediction.

17. The branch predictor according to claim 1, wherein the override determining circuit includes a bimodal override predictor configured to generate an override signal based on a program counter value.

18. A non-transitory computer-readable storage medium storing a set of instructions for execution by one or more processors to facilitate manufacture of a branch predictor, the branch predictor comprising:
a Level 1 branch predictor configured to generate a Level 1 branch prediction, wherein the Level 1 branch predictor includes:
a bias weight array;
a first predictor, including a first hash generator and a bimodal counter array;
a bimodal chooser; and
a multiplexer connected to the bias weight array, the first predictor, and the bimodal chooser;
a Level 2 branch predictor configured to generate a Level 2 branch prediction;
a match determining circuit configured to determine whether the Level 1 branch prediction matches the Level 2 branch prediction; and
an override determining circuit configured to determine whether to override the Level 1 branch prediction with the Level 2 branch prediction.

19. The non-transitory computer-readable storage medium of claim 18, wherein the instructions are hardware description language (HDL) instructions used for the manufacture of a device.

* * * * *